United States Patent
Komai et al.

(10) Patent No.: US 6,238,783 B1
(45) Date of Patent: May 29, 2001

(54) THERMOPLASTIC RESIN COATED ALUMINUM ALLOY SHEET, AND METHOD AND APPARATUS FOR PRODUCTION THEREOF

(75) Inventors: Masao Komai, Yamaguchi-ken; Ayumu Taniguchi, Tokyo; Keiichi Shimizu, Yamaguchi-ken; Jun-ichi Tanabe, Yamaguchi-ken; Fumio Kunishige, Yamaguchi-ken, all of (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/155,351

(22) PCT Filed: Mar. 24, 1997

(86) PCT No.: PCT/JP97/00967

§ 371 Date: Feb. 4, 1999

§ 102(e) Date: Feb. 4, 1999

(87) PCT Pub. No.: WO97/35717

PCT Pub. Date: Oct. 2, 1997

(30) Foreign Application Priority Data

Mar. 27, 1996 (JP) .................................................. 8-925829

(51) Int. Cl.$^7$ ..................................................... B32B 15/08
(52) U.S. Cl. ..................................... 428/312.8; 428/307.3; 428/315.5; 428/315.9; 428/318.4; 428/319.3
(58) Field of Search .............................. 428/307.3, 312.8, 428/315.5, 315.9, 318.4, 319.3

(56) References Cited

FOREIGN PATENT DOCUMENTS

| | | |
|---|---|---|
| 57-182428 | 11/1982 | (JP) . |
| 3-033506 | 2/1991 | (JP) . |
| 3-044496 | 2/1991 | (JP) . |
| 6-267638 | 9/1994 | (JP) . |
| 6-272015 | 9/1994 | (JP) . |

*Primary Examiner*—Helen L. Pezzuto
(74) *Attorney, Agent, or Firm*—Browdy & Neimark

(57) ABSTRACT

A thermoplastic resin coated aluminum alloy sheet has excellent processing adhesion and high adhesion after retort processing such that laminated thermoplastic resin layers do not peel off even when the alloy sheet is subjected to severe processing such as stretching after deep drawing and furthermore, ironing. A production method and a production apparatus for the alloy sheet are also described. A treatment by an alkaline solution and a treatment by an acidic solution are sequentially applied to bring the surface of an aluminum alloy sheet into a specific surface state and then electrolytic chromic acid treatment is carried out by a known method so as to laminate a thermoplastic resin to an aluminum alloy sheet having a two-layered film which comprises metallic chromium as the lower layer and a chromium hydrate as the upper layer and has a specific surface condition. As a result, a thermoplastic resin coated aluminum alloy sheet having excellent processing adhesion capable of withstanding molding and processing can be obtained.

24 Claims, No Drawings

“THERMOPLASTIC RESIN COATED ALUMINUM ALLOY SHEET, AND METHOD AND APPARATUS FOR PRODUCTION THEREOF”

TECHNICAL FIELD

The present invention relates to a manufacturing method and a manufacturing apparatus of a thermoplastic resin laminated aluminum alloy sheet mainly used for can stocks. More in detail, it relates to a thermoplastic resin laminated aluminum alloy sheet of which at least one side is covered with a thermoplastic resin, having excellent formability, adhesion after forming, corrosion resistance, impact resistance and retainability of flabor. Therefore, it is suitable not only for common use such as can lid or drawn can, but also for drawn and compression formed can, drawn and stretch-formed can, drawn, stretch-formed and further compression formed can which require extremely excellent formability, adhesion after forming and adhesion after retort treatment. And it further relates to a manufacturing method and a manufacturing apparatus of the thermoplastic resin laminated aluminum alloy sheet.

BACKGROUND TECHNIQUE

An aluminum alloy sheet laminated with a thermoplastic resin, for example polyester resin, has already been used for the manufacture of can lids and so on. However, when adhesion of the laminated thermoplastic resin layer to the aluminum alloy sheet is not sufficient, there are some cases where the thermoplastic resin layer peels off during forming and corrosion is generated at the portion where adhesion of the laminated thermoplastic resin layer is not sufficient. The adhesion is affected by formability of the aluminum alloy sheet and characteristics of the thermoplastic resin to be laminated thereto, and it is particularly affected by the surface roughness of the aluminum alloy sheet. For this reason, several surface pre-treatments mentioned below have been so far given to an aluminum alloy sheet in order to improve the adhesion of a thermoplastic resin layer or a coating layer to the aluminum alloy sheet.

(1) Chemical treatment of an aluminum alloy sheet in a phosphate solution or in a chromate solution
(2) Coating a thermosetting resin primer on one surface of a thermoplastic resin film or on an aluminum alloy sheet
(3) Forming an anodic oxide film having 5 to 60% of an occupied area rate by micro pores of 2000 angstrom or more of diameter and 5 μm or less of depth on an aluminum alloy sheet using a solution including chromic acid (Laid Open Japanese Patent No. Hei 3-44496)
(4) Forming an oxide film having 20 angstrom or more of thickness by heating an aluminum alloy sheet for 2 hours or more at the temperature of 250 to 650° C. in the atmosphere after cleansing (Laid Open Japanese Patent No. Hei 6-272015)
(5) Forming an oxide film having 500 to 5000 angstrom of thickness and branched micro pores by electrolytically treating in an alkali solution using alternate wave-form current after cleansing (Laid Open Japanese Patent No. Hei 6-267638)

In the aforementioned chemical treatment (1) in a phosphate solution or in a chromate solution, phosphate, chromate or fluoride is mainly used in the treating solution, and the formed film by the chemical treatment has an effect on the improvement of adhesion of coating film. Therefore, it is generally used. But when the thus chemically treated aluminum alloy sheet covered with a coating or laminated with a thermoplastic resin is formed by a more severe than usual forming, which is the objective of the present invention, the coating or the laminated thermoplastic resin tends to peel off, which is not favorable. Coating a primer for adhesion according to treatment (2) is not favorable from the viewpoint of an increase in cost for coating of primer as well as the productivity because it requires another process for baking. It also requires an exhauster for organic solvent. Forming an anodic oxide film (3) having specified micro pores using chromate solution is not favorable from the viewpoint of productivity because it takes long time to form the anodic oxide film and there is a tendency of peeling off of the thermoplastic resin layer when the laminate is heavily formed. Forming an oxide film (4) by heating in the atmosphere for a long time is not favorable since the thermoplastic resin layer peels off when the laminate is heavily formed as with the case of (3), and this prior technique is also unfavorable from the viewpoint of productivity because it takes a long time to form the oxide film. Forming an oxide film (5) having 500 to 5000 of thickness by electrolytically treating in an alkali solution using alternate wave-form current can be practiced continuously in a short duration of electrolysis and has some effect on the adhesion after forming of the laminated resin film; however, it does not give sufficient adhesion after forming since the laminated resin film peels off when the laminate is heavily formed as drawn, stretch-formed and further pressed.

As mentioned above, the lamination of a thermoplastic resin on aluminum alloy sheet that is surface-treated using conventional surface-treating manner can not be successfully used for adhesion therebetween after heavy forming, which is the objective of the present invention, since the laminated thermoplastic resin layer peels off when the laminate is heavily formed as drawn, stretch-formed and further pressed.

The technical problems to be solved by the present invention is to produce a thermoplastic resin laminated aluminum alloy sheet having excellent adhesion after forming in such a manner that the laminated thermoplastic resin does not peel off even when the laminate is deep-drawn, stretch-formed and further pressed to shape, that is superior to a laminate in which resin film is laminated on the conventionally surface-treated aluminum alloy sheet, and to obtain excellent adhesion after sterilization. The technical problems to be solved by the present invention are is also to produce a manufacturing method and a manufacturing apparatus thereof which can produce the laminate at low cost and high production speed.

DISCLOSURE OF INVENTION

A thermoplastic resin laminated aluminum alloy sheet of the present invention is characterized in that a thermoplastic resin is laminated on at least one side of an aluminum alloy sheet in which the specific surface area is increased by electrolytical treatment in a chromate solution so that the increasing rate of the specific surface is in the range of 7 to 45%.

It is characterized in that an aluminum alloy sheet is favorably treated in an alkali solution and followed by being treated in acid solution so that the increasing rate of the specific surface on the surface of the alloy sheet is in the range of 3 to 30%, and wherein the so-treated sheet is electrolytically treated in the chromate solution, and after that a thermoplastic resin is laminated on at least one side of the thus surface treated aluminum alloy sheet. It is favorable that in such a thermoplastic resin laminated aluminum alloy sheet micro pores are formed on the surface of the aluminum alloy sheet after the treatment in alkali solution and in acid solution, in which the diameter of the micro pores is in the range of 50 to 3000 nm, the maximum depth is 1000 nm or less, and the occupied area rate by the micro pores is in the range of 10 to 95%. It is further favorable that the average diameter of the micro pores is in the range of 200 to 900 nm, the depth of such micro pores is half or less than the diameter, and the pores are formed along the thickness direction from the surface of the aluminum alloy sheet.

Further, it is favorable that the thermoplastic resin is polyethylene terephthalate, copolyester resin mainly composed of ethylene terephthalate unit, polyester resin mainly composed of butylene terephthalate unit, blended resin of these resins or multi-layered composite resin of these resins.

Furthermore, it is also preferable that the thermoplastic resin to be laminated is a multi-layered resin composed of an upper layer and a lower layer of polyester resin and an intermediate layer of a blended resin consisting of polyester resin blended with bis-phenol A polycarbonate or bis-phenol A polycarbonate.

The manufacturing method of a thermoplastic resin laminated aluminum alloy sheet of the present invention is characterized that an aluminum alloy strip is continuously treated in alkali aqueous solution, treated in acid solution after rinsing, electrolytically treated in chromate solution after and then rinsed and dried followed by laminating thereto of a thermoplastic resin. It is preferable that the alkali solution is an aqueous solution containing 10 to 200 g/l of one or more than one kind selected from the group consisting of hydroxide, carbonate, bicarbonate, phosphate, silicate and borate of alkali metal or ammonium as a main component, the acid solution is an aqueous solution containing 10 to 300 g/l of one or more than one kind selected from the group consisting of sulfuric acid, hydrochloric acid, nitric acid and phosphoric acid. The treatment using alkali solution is favorably dipping in the alkali solution or spraying the alkali solution, and the treatment using acid solution is favorably dipping in the acid solution or spraying the acid solution. As for the electrolytical treatment in chromate solution, the solution is favorably one mainly composed of anhydrated chromic acid added by one or more than one kind selected from the group consisting of a little amount of sulfuric acid, hydrofluoric acid, hydrofluoboric acid, hydrofluosilicic acid, sulfate, fluoride, fluoboride, and fluosilicate 5 of alkali metal or ammonium. The manufacturing apparatus of a thermoplastic resin laminated aluminum alloy sheet of the present invention is characterized that a treating tank of alkali solution, rinsing tank, a treating tank of acid solution, rinsing tank, a treating tank for electrolytical chromate treatment, rinsing tank, and a drying equipment and laminating equipment for the lamination of a thermoplastic resin are serially arranged in this order.

THE BEST MANNER TO PRACTICE THE PRESENT INVENTION

An aluminum alloy sheet is treated in an alkali solution mainly composed of sodium hydroxide or like and successively treated in an acid solution mainly composed of sulfuric acid or like so that the aluminum alloy sheet has a specified surface condition. After that, the aluminum alloy sheet is electrolytically treated in chromate solution so that a film consisting of a lower layer of metallic chromium and an upper layer of hydrated chromium oxide are provided on the surface of the aluminum alloy sheet. After rinsing and drying, the thus treated aluminum alloy sheet is heated to a temperature above the melting temperature of a thermoplastic resin to be laminated and a thermoplastic resin is laminated on it using either known film laminating methods or extrusion laminating methods. Thus, a thermoplastic resin laminated aluminum alloy sheet having excellent adhesion after forming such that the laminated thermoplastic resin layer does not peel off even when the laminate is heavily formed as drawn, stretch-formed and further press-shaped, the laminate also having excellent adhesion after retort treatment such that the laminated thermoplastic resin layer does not peel off even when the laminate is treated in the high-temperature steam in the range of 100 to 130° C. (retort treatment).

Hereinafter, the present invention is explained in detail.

First, the aluminum alloy sheet used in the present invention is not particularly limited as far as heavy forming such as drawing, stretch-forming and further press-shaping is concerned, which is the objective of the present invention. However, aluminum alloy sheets of 3000 series and 5000 series having 0.20 to 0.35 mm of thickness, which are widely used as can stocks, are preferable from the viewpoint of cost and formability. Since the aluminum alloy sheet of the present invention is formed after a thermoplastic resin is laminated on both sides of it, there is no necessity for solid-state lubrication on the surface which is normally essential for an aluminum alloy sheet to be drawn and ironed can (DI can). The aluminum alloy sheet is only selected taking into consideration the ease of electrolytical etching on the surface and for surface treatment, and adhesion after forming of a thermoplastic resin to be laminated.

Next, the surface condition of the aluminum alloy sheet to be a base for lamination of a thermoplastic resin is explained.

The surface condition of the aluminum alloy sheet used in the present invention can only be obtained by electrolytical treatment in chromate solution after the surface of the aluminum alloy sheet is made into a specified surface condition by the treatment in alkali solution and in acid solution, in which the increase rate of the specific surface area is 7 to 45%, which is a key feature of the present invention. Thus, an aluminum alloy sheet having excellent adhesion of a thermoplastic resin layer such that the laminated resin layer does not peel off even when heavily formed and withstands retort treatment can be obtained. The surface condition having the increase rate of the specific surface area within the above-mentioned range can be attained by the treatment in alkali solution and in acid solution alone, and an aluminum alloy sheet having excellent adhesion of a thermoplastic resin layer such that the laminated resin layer does not peel off even when heavily formed can be obtained. However, since such an aluminum alloy sheet has inferior adhesion of the resin layer after retort treatment, it is difficult to be applied to cans for beverages such as coffee, tea and so on, which is retort-treated after the content is packed.

The reason for the effect of the electrolytical chromate treatment is not known well; however, it is supposed that the increase of the surface area caused by the formation of micro pores by the alkali solution and acid solution treatments increases the anchoring effect, and the increase of the surface area caused by the precipitation of the granular metallic chromium which constitutes the lower layer of the double layer formed by the subsequent electrolytical chromate treatment and the existence of the uppermost layer of the hydrated chromium oxide have an effect on the adhesion after forming of the thermoplastic resin layer to be laminated and the adhesion after the retort treatment of it.

The surface condition of the aluminum alloy sheet formed by the treatments in alkali solution, and later in acid solution and the surface condition of the uppermost layer after the electrolytical chromate treatment can be specified by the observation using an atomic force microscope which is to be later mentioned. Concretely, in the case where the increase rate of the specific area is 7 to 45%, preferably 10 to 40%, determined by the measurement at any 5 points on the aluminum alloy sheet surface that is electrolytically treated in chromate solution, the aluminum alloy sheet has excellent adhesion after forming, that is, the laminated thermoplastic resin layer never peels off even when the heavy forming which is the objective of the present invention, is performed on it. In particular, in the case where the pre-treatments in alkali solution and in acid solution reapplied before the electrolytical chromate treatment the increase rate of the specific area is 3 to 30%, preferably 4 to 20%, determined by the measurement at any 5 points on the aluminum alloy sheet surface after the treatment in acid solution; the aluminum alloy sheet has excellent adhesion after forming, that is, the laminated thermoplastic resin layer never peels off even when heavy forming, which is the objective of the present invention, is performed. Further, it is preferable that the diameter of formed micro pores is in the range of 50 to 3000 nm, the maximum depth of it is 1000 nm or less, and the occupied area rate by the pores is in the range of 10 to 95%. More preferably, the diameter of formed micro pores is in the range of 50 to 1200 nm, the maximum depth of it is 600 nm or less, and the occupied area rate by the pores is in the range of 20 to 90%.

The microscopic surface condition of the aluminum alloy sheet is extremely critical for the adhesion, after forming, of the thermoplastic resin layer to the surface of the aluminum alloy sheet. Conventionally practiced mechanical surface roughening or surface roughening by electrolytical etching have some effect on the adhesion after forming of the thermoplastic resin layer to be laminated, however, the thermoplastic resin layer peels off when heavy forming, which is the objective of the present invention, is performed on the laminate. The reason for this phenomenon is not well known, however, it is supposed that these treatments cause deep recessed portions or pores having depth that is more than half of their diameter and thermally melted thermoplastic resin does not fully penetrate into the recessed portions or pores of the aluminum alloy sheet, thereby not producing enough anchoring effect. Namely, it is important that micro pores having the depth half or less of their diameter are mainly formed along the thickness direction from the aluminum alloy sheet surface. It is supposed that since the thermoplastic resin penetrates deep enough into the bottom of the thus formed micro pores and a sufficient anchoring effect can be obtained, excellent adhesion of the thermoplastic resin to the aluminum alloy sheet is present even after the heavy forming. Namely, the surface condition of an aluminum alloy sheet to be laminated with a thermoplastic resin should have a specified surface area so as to secure the excellent adhesion with the thermoplastic resin. The surface area hereon is different from the conventional surface roughness measured using a tracer method and resembles the one in the surface state that extremely microscopic unevenness of nanometer order is formed, so called the surface activity.

In the present invention, the increase rate of the specific surface area of the aluminum alloy sheet was determined as follows:

i) The ratio (specific area) of the imaginary area of the sample having no unevenness (projected area), that was the standard, to the later measured area of the sample of the present invention (actual area) was calculated.

ii) The increasing rate of the ratio was shown in percentage.

In the actual measurement of the increase rate of the specific surface area, the surface of a sample was observed using the atomic force microscope "Nanoscope III a" made by Digital Instruments Inc. and 5 μm-square area of the sample surface was measured in 512 picture elements per 1 line. Measurement was made at the different 5 portions varying the measuring visual field. The average of the measured values was determined as the actual surface area A (numerator), and the projected area of the measuring sample which was an imaginary area in the case where the sample surface had no unevenness was determined as B (denominator=standard). After that, the increase rate of the ratio of A to B was calculated as percentage, and the increase rate of the specific area was determined by the following equation:

$$\text{the increase rate of the specific area } (C) = (A/B - 1) \times 100.$$

In the present invention, it has already been shown that the increase rate of the specific area of the electrolytically chromate-treated aluminum alloy sheet should be in the range of 7 to 45%, which is measured using the above-mentioned method, so that the remarkable effect can be shown in the improvement of the adhesion after forming with a thermoplastic resin, which is necessary to obtain the excellent adhesion after forming, which can endure the heavy forming. When the increase rate of the specific area does not exceed 5% after the electrolytical chromate treatment, the adhesion of the laminated thermoplastic resin layer after heavy forming is secured, but after that the retort treatment is not enough, and the resin layer sometimes peels off. The increase rate of the specific area should be secured in the range of 7% or more in order to secure the adhesion after the retort treatment. The increase rate of the specific area of 45% or more made by the electrolytical chromate treatment is favorable from the viewpoint of the adhesion after forming of the thermoplastic resin layer and the adhesion after the retort treatment, however, the increase rate of the specific area of the aluminum alloy sheet should be made to 30% or more by the treatments in alkali solution and in acid solution alone before the electrolytical chromate treatment is given to it in order to obtain the increase rate of the specific area of 45% or more by the subsequent electrolytical chromate treatment. And a lot of micro pores having a large maximum depth exceeding 1000 nm should be formed so as to obtain such a surface condition. Even if the aluminum alloy sheet having such a surface condition is electrolytically chromate-treated, the recessed portions are not covered enough with the film formed by the electrolytical chromate treatment to substantially improve the adhesion after the retort treatment. Namely, the aluminum alloy sheet having 7 to 45% of the increase rate of the specific surface can be obtained by treatments in alkali solution and in acid solution which make the aluminum alloy sheet surface into the condition in which micro pores have a diameter in the range of 50 to 3000 nm and the maximum depth of 1000 nm or less, and the occupied area rate by the micro pores is 10 to 95%, and the increase rate of the specific area is in the range of 3 to 30%, and by the subsequent electrolytical chromate treatment which precipitates metallic chromium. By the way, there is a relation between the diameter and the depth of the micro pores and the occupied area rate by the micro pores. There is an inclination that the greater the diameter, the greater the depth. Further, there is an inclination that the more micro pores are formed, namely, the greater the occupied area rate, the greater the diameter and the depth. In the actual measurement, the aforementioned increase rate of the specific area as well as the maximum depth were determined using an atomic force microscope after five portions were marked on the sample surface as the data bases. Since there is a correlation between the maximum depth and the diameter, the measurement was made on the longitudinal section where a micro pore having the maximum diameter in the visual field was cut in the vertical direction, and the depth was measured and determined as the maximum depth. Before the measurement, a preparatory measurement was made in which 3 pores were selected having the greatest diameter and the depth of them were compared. The measurement for determing the maximum depth in this manner was supposed to be appropriate since the pore with the maximum diameter had the maximum depth. As for the diameter of micro pore and the occupied area rate by the micro pores, after the secondary electron image in the same visual field as that observed by an atomic force microscope was photographed using a scanning electron microscope based on the marks given on the sample surface, the diameter of micro pores, strictly speaking, corresponding diameter because the section of the pore is not always a real circle, the average diameter and the occupied area rate by the micro pores were determined using a picture analyzer "TOSPIX-U" made by Toshiba Inc. taking the secondary electron image as an input picture.

The increase rate of the specific area caused by the electrolytical chromate treatment is in the range of 3 to 15%, and the precipitation of the granular metallic chromium should be increased for enlarging the increase rate of the specific area. But the superfluous precipitation of the metallic chromium deteriorates the appearance, which is not favorable.

It has already been mentioned that the surface condition of the aluminum alloy sheet formed by the treatments in alkali solution and in acid solution is preferable in the above-mentioned specified range, and in the case where the diameter of the formed micro pores is less than 50 nm and the occupied area rate by the micro pores is less than 10%, the anchoring effect is not sufficient so that the laminated thermoplastic resin layer does not have enough adhesion after forming, therefore the resin layer peels off when the laminate is heavily formed. Further, in the case where the diameter of the micro pores is more than 3000 nm, the maximum depth of it is more than 1000 nm and the occupied area rate by the micro pores is more than 95%, the surface is excessively roughened even by microscopic evaluation and the thermally melted thermoplastic resin does not fully penetrate into the formed recessed portions, which causes poor anchoring effect, so that the adhesion after forming of the laminated thermoplastic resin layer is possibly decreased, which not preferable.

Next, the treating method for obtaining the above-mentioned surface condition of the aluminum alloy sheet is explained.

The objective of the treatment in alkali solution is to eliminate the grease and the oxide film existing on the surface of the aluminum alloy sheet by dissolving them. In the alkali treatment, the surface is sometimes etched to some extent. The aqueous solution, containing one or more than one kind selected from the group consisting of hydroxide, carbonate, bicarbonate, phosphate, silicate and borate of alkali metal or ammonium as a main component, is used for the treatment in alkali solution. The addition of a surfactant to the alkali solution is favorable since it improves the wettability of the surface by the alkali solution and the degreasing power. The concentration of the above-mentioned alkali solution is preferably in the range of 10 to 200 g/l, more preferably in the range of 30 to 100 g/l. The temperature of the alkali solution is preferably in the range of 30 to 80° C., more preferably in the range of 45 to 60° C.

The treatment is carried out by dipping the aluminum alloy sheet into the alkali solution or spraying the alkali solution on the aluminum alloy sheet. 1 to 30 seconds is fully enough for the treatment duration, and 3 to 15 seconds is more preferable. Although it is possible to electrolyze the aluminum alloy sheet in the alkali solution using direct current or alternate current, these method require an equipment for electrolysis and are not only unfavorable from the viewpoint of economy, but it is also unsuitable as a method for obtaining the aluminum alloy sheet having the surface condition of the present invention since the local perforation proceeds in some cases. In the case where the concentration of the alkali compound contained in the alkali solution is less than 10 g/l or the temperature of the alkali solution is less than 30° C., it takes a long time to fully reject the grease and the oxide film existing on the aluminum alloy sheet by dissolving and hinders the continuous production of a thermoplastic resin laminated aluminum alloy sheet of the present invention, which is not preferable. On the other hand, in the case where the concentration of the alkali compound contained in the alkali solution exceeds 200 g/l, not only the quantity of the alkali compound taken out but also the quantity of the dissolved aluminum alloy sheet increases, which is also unfavorable in the economical viewpoint. Further, since the alkali compound retained on the surface of the aluminum alloy sheet is not rinsed well enough, which deteriorates the subsequent acid solution treatment, it is not favorable. In the case where the temperature of the alkali solution exceeds 80° C., the local perforation proceeds in some cases although the oxide film existing on the aluminum alloy sheet is easily rejected, which makes it difficult to obtain an aluminum alloy sheet having the surface condition required for the present invention as well as increasing the quantity of the dissolved aluminum alloy sheet, which it is not preferable.

Next, the treatment in the acid solution after rinsing is explained. The objective of the treatment in the acid solution is to reject the smut retained on the surface of the aluminum alloy sheet that is alkali-treated and increase the surface area in a range from 3 to 30% of the increase rate of the specific surface area, which is one of the characteristic of the present invention, by uniformly etching the surface of the aluminum alloy sheet. In particular, it is to obtain the surface condition in which micro pores having 50 to 3000 nm of the diameter and 1000 nm or less of the maximum depth are formed and the occupied area rate by the micro pores is 10 to 95%. The aqueous solution containing one or more than one kind selected from the group consisting of sulfuric acid, nitric acid, hydrochloric acid, phosphoric acid and so on as main component is used for the acid treatment. The concentration of the solution is preferably in the range of 10 to 300 g/l, more preferably 30 to 150 g/l. The temperature of the acid solution is preferably in the range of 5 to 60° C., more preferably 15 to 40° C. Dipping the alkali-treated aluminum alloy sheet into the acid solution or spraying the acid solution on said aluminum alloy sheet is used as a treating method. The treating duration is short enough for 1 to 30 second, preferably 3 to 15 second. Although it is possible to electrolytically etch the aluminum alloy sheet surface by direct-current electrolysis or alternative-current electrolysis using the acid solution, the surface is locally etched by the electrolytical etching method and the surface condition required for the present invention can not obtained. Furthermore, since it needs an electrolysis equipment, this method is not favorable. In the case where the concentration of the acid solution is less than 10 g/l or the temperature of the acid solution is less than 5° C., it takes a long time to obtain the surface condition necessary for the present invention, which is not preferable since the continuous production of a thermoplastic resin laminated aluminum alloy sheet of the present invention is hindered. On the other hand, in the case where the concentration of the acid solution exceeds 300 g/l, although the surface condition necessary for the present invention can be obtained without hindrance, the quantity of the acid taken out in the continuous production increases, which is unfavorable from the economical viewpoint. Further, the acid treatment at the high temperature is not favorable since the economical loss by heating and the corrosion sensitivity of the treating equipment becomes greater in accordance with the rise of the temperature of the acid solution.

Subsequently, the aluminum alloy sheet treated in the acid solution is electrolytically chromate-treated after rinsing. The solution, mainly composed of known chromic acid anhydride, which is used for the electrolytical chromate-treatment of a steel sheet, singly or plurally added by a small quantity of sulfuric acid, hydrofluoric acid, hydrofluoboric acid, hydrofluosilicic acid, or sulfate, fluoride, fluoboride, or fluosilicate of alkali metal or ammonium, is used for the electrolytical chromate-treatment. The granular metallic chromium is more easily precipitated on the aluminum alloy sheet using the solution added by an auxiliary agent containing fluorine than the solution added by an auxiliary agent that is sulfuric acid or sulfate. Therefore, it is preferable to use the solution added by an auxiliary agent containing fluorine since the increase rate of the specific area becomes greater after the electrolytical chromate-treatment. The concentration of chromic acid anhydride as a main component is preferably in the range of 20 to 100 g/l. The preferable quantity of the auxiliary agent slightly varies according to the kind. It is preferably 0.5 to 25 weight % of the concentration of chromic acid anhydride, more preferably 2 to 20 weight % of it. The electrolytical chromate-treatment is generally practiced on the condition of 30 to 60° C. of the solution temperature and 10 to 100 A/dm$^2$ of cathodic current density using the treating solution having the above-mentioned composition. 50 A/dm$^2$ or more of the cathodic current density preferably makes the increase rate of the specific area greater by the precipitation of the granular metallic chromium.

In the film formed by the electrolytical chromate treatment practiced on such conditions, the quantity of the metallic chromium of the lower layer is preferably in the range of 1 to 50 mg/m$^2$, more preferably in the range of 2 to 10 mg/m$^2$. And the quantity of the hydrated chromium oxide of the upper layer is preferably in the range of 1 to 25 mg/m$^2$ as chromium, more preferably in the range of 2 to 10 mg/m$^2$. In the case where the quantity of the metallic chromium is less than 1 mg/m$^2$, only a little increase of the increase rate of the specific area can be obtained and the electrolytical chromate-treatment scarcely affects it. In the case where the quantity of the hydrated chromium oxide of the upper layer is less than 1 mg/m$^2$ as chromium, the adhesion after the retort treatment of the laminated thermoplastic resin layer is not improved even if the quantity of the metallic chromium is within the above-mentioned range, and the electrolytical chromate-treatment scarcely affects it. On the other hand, in the case where the quantity of the hydrated chromium oxide exceeds 25 mg/m$^2$ as chromium, the hydrated chromium oxide is not uniformly formed according to location since a lot of them is formed, and the surface roughness becomes remarkable so that the adhesion after forming of the laminated thermoplastic resin layer is deteriorated and the appearance turns dark brown, which is unfavorable.

In the present invention, as for the thermoplastic resin to be laminated on the aluminum alloy sheet, one kind, more than one kind of copolymer or more than one kind of blended composite resin selected from the group consisting of polyethylene, polypropylene, polyester, polyamide, polycarbonate, polyvinylchloride, polyvinylidene chloride and acrylate resin can be used. These thermoplastic resin have varied characteristics such as heat resistance, corrosion resistance, formability and adhesion, and they should be selected according to the aimed use. In particular, for the use in which heavy forming is conducted such as the can produced by stretch-forming and subsequent ironing after drawing, polyester, particularly polyethylene terephthalate, copolyester mainly composed of ethylene terephthalate, polyester mainly composed of butylene terephthalate or composite resin blend of these resins are preferably used. The biaxially oriented film of these resins is more preferably used. Further, for the use where impact resistance is required, a composite resin composed of the above-mentioned polyester blend of bisphenol A polycarbonate, or a multi-layered resin composed of an upper layer and lower layer of the above-mentioned polyester and an intermediate layer of a composite resin composed of the above-mentioned polyester blend of bisphenol A polycarbonate or bisphenol A polycarbonate is preferably used.

In addition, in the case where the adhesion of these thermoplastic resin layer to the aluminum alloy sheet is not enough or enough adhesion can not be obtained by thermoplastic resin layer alone, methods such that a thermoplastic resin is laminated after an adhesive of thermosetting resin such as phenol-epoxy resin is coated on an aluminum alloy sheet or a thermoplastic resin film is previously coated by the adhesive on the side to be laminated. However, the method using these adhesive should not be adopted except of necessity since it not only increases the cost but also needs a prevention for environmental pollution caused by organic solvent contained in the using adhesive.

The thickness of the thermoplastic resin layer to be laminated should be determined taking into consideration of the required properties. In general, the thickness is preferably in the range of 5 to 50 $\mu$m, more preferably in the range of 10 to 25 $\mu$m. The productivity is remarkably deteriorated in the formation of the thermoplastic resin layer having a thickness of less than 5 $\mu$m using either film laminating method or extrusion laminating method, in which pinholes are apt to be caused and enough corrosion resistance after forming can not be obtained. On the other hand, the formation of the thermoplastic resin layer having a thickness of more than 50 $\mu$m is not economical compared to widely used coating. Further, the addition of stabilizer, antioxidant, antistatic agent, pigment, lubricant or corrosion inhibitor at need does not cause any problem.

Next, laminating method of a thermoplastic resin is explained. As for laminating method of a thermoplastic resin, either a method in which the above-mentioned thermoplastic resin is thermally melted and laminated on an aluminum alloy sheet by extrusion or a method in which the above-mentioned thermoplastic resin film is thermally melted and laminated can be adopted, and both methods can jointly be used. Although it is hard to operate the extrusion laminating method at higher speeds, it can suit the production speed in the process, in which a thermoplastic resin is laminated on an aluminum alloy sheet, in advance of the continuous production of can formed by drawing, and can laminate the resin layer by thermally melting resin pellets and extruding the melted resin on the aluminum alloy sheet. Therefore, it has an advantage in cost. The film laminating method, in which thermoplastic resin film is thermally melted and laminated on an aluminum alloy sheet using a film formed by thermally melting resin pellets, enables lamination of a resin film at higher speed, and in more uniform film thickness. Therefore, it is suitable for mass production in high speed.

Moreover, in the thermoplastic resin laminated aluminum alloy sheet obtained by the production method of the present invention, it is possible to interpose an adhesive composed of thermosetting resin such as epoxy-phenol resin between the aluminum alloy sheet and the thermoplastic resin layer. But the use of the adhesive causes increase in cost. Therefore, it is preferable that it is only used for the inside of a can packed with more corrosive contents, that is the case when more excellent corrosion resistance is required. In the case where the adhesive is used, a thermoplastic resin can be laminated using the above-mentioned method after the adhesive is coated on the aluminum alloy sheet, or a thermoplastic film of which one side to be laminated to the aluminum alloy sheet is coated by the adhesive can be laminated.

Next, the arrangement of the production equipment is explained. The arrangement, in which a treating tank for alkali treatment, rinsing tank, treating tank for acid treatment, rinsing tank, drying equipment and equipment for lamination of thermoplastic resin are serially arranged in order, has an economical advantage in that only one pay-off reel equipment at the entrance of a line and only one tension reel equipment which coils up the aluminum alloy strip at the delivery of a line have to be installed in the line. Further, when the waiting duration until a thermoplastic resin is laminated after the treatment in alkali solution and in acid solution is extremely long, several problems such as oxidation of aluminum alloy sheet surface or contamination by contaminants in atmosphere. However, since the above-mentioned equipments are serially arranged, the waiting duration until a thermoplastic resin is laminated after the treatment in alkali solution and in acid solution is rejected and the characteristics of the thermoplastic resin laminated aluminum alloy sheet are stabilized.

The present invention is concretely explained showing examples and comparative examples in the following.

EMBODIMENT (Example 1 to 8 and Comparative Example 1 to 4)

As Example 1 to 8 of the present invention and Comparative example 1 to 4, an aluminum alloy sheet (JIS 3004) having 0.26 mm of thickness was treated in alkali solution, rinsed, treated in acid solution and rinsed on the conditioned shown in Table 1, and then electrolytically chromate treated on the conditions shown in Table 2 in order, followed by rinsing and drying. The surface condition of the aluminum alloy sheet before the electrolytical chromate treatment, that is, the maximum diameter, the minimum diameter, average diameter, and the maximum depth of micro pores, the occupied area rate by the pores and the increase rate of the specified area were measured in the selected five portions using an atomic force microscope and an image processor. At the same time, the surface condition of the aluminum alloy sheet after the electrolytical chromate treatment, that is the increase rate of the specific area, was measured. After the thus surface-treated aluminum alloy sheet was heated to 240° C., biaxially oriented film (on the side to be inside of a can: 25 μm thickness, on the side to be outside of a can: 15 μm thickness) of copolyester resin composed of 85 mole % of polyethylene terephthalate and 15 mole % of polyethylene isophthalate is simultaneously laminated on both sides of it, and immediately after that the laminate was dipped into water and quenched.

After drying, paraffine wax was coated on both side of the laminate in the quantity of about 50 mg /m², then the laminate was formed as mentioned following. At first, a blank having 160 mm of diameter was punched out from the laminate, then the blank was formed into a drawn can having 100 mm of diameter. Next, the drawn can was formed into a redrawn can having 80 mm of diameter by redrawing. After that, the redrawn can was formed into a drawn and ironed can having 66 mm of diameter by a composite forming comprising stretch-forming and simultaneous ironing. In the composite forming, the forming was practiced on the conditions in which the distance between redrawing portion that is to be the upper end portion of a can and ironing portion was 20 mm, R at shoulder portion of redrawing die was 1.5 times the sheet thickness, clearance between redrawing die and punch was 1.0 time the sheet thickness and clearance at ironing portion was 50% of sheet thickness. Subsequently, the upper end portion of a can was trimmed, neck-in formed and flange-formed using known methods. Break rate of can wall, appearance of outer surface of a can and metal exposure on inner surface of a can of the thus obtained can body, adhesion after forming of laminated thermoplastic resin layer to aluminum alloy sheet and adhesion after retort treatment of thermoplastic resin layer were evaluated based on the standard shown in the following. The results of evaluation were shown in Table 3. Metal exposure on inner surface of a can was determined by a method measuring enamel rater value (ERV). Namely, 3% salt solution was packed into the obtained can body and a stainless steel rod was dipped into it as a cathode. 6.3 volt of voltage was charged between the cathode and the can body as an anode. When aluminum alloy sheet under thermoplastic resin layer is exposed at only a little portion at this charge, current flows between both electrodes. Metal exposure on inner surface of a can was evaluated by the current value as ERV.

A) Break rate of can wall
  ⊚: 0%, ○: less than 10%, Δ: 10% or more and less than 30%, ×: 30% or more or more
B) Metal exposure on inner surface of a can (evaluated by enamel rater value [ERV: mA])
  ⊚: 0 mA or more and less than 0.05 mA %, ○: 0.05 mA or more and less than 0.5 mA, Δ: 0.5 mA or more and less than 5.0 mA %, ×: 5.0 mA or more
C) Adhesion after forming of laminated resin layer (evaluated by a degree of peeling-off after neck-in forming)
  ⊚: no peeling off, ○: little peeling-off which causes no practical problem, Δ: heavy peeling-off, ×: peeling-off at the whole upper portion of a can
D) Adhesion after retort treatment of laminated resin layer
The degree of peeling-off of the resin layer was evaluated after the obtained can body was exposed in a retort oven at 130° C. under 1.6 kg/cm² of pressure for 30 minutes.

⊚: no peeling off, ○: little peeling-off which causes no practical problem, Δ: heavy peeling-off, ×: peeling-off at the whole upper portion of a can The detail conditions for treatment and results of Example 1 to 8 and Comparative example 1 to 4 are as shown in Table 1 to 3. In Example 1 to 3, the aluminum alloy sheet was treated in the same alkali (NaOH) solution and in the same acid ($H_2SO_4$) solution and the same surface condition before electrolytical chromate treatment was obtained. After that, varied electrolytical chromate treatment was practiced in each Example. The quantity of metallic chromium and hydrated chromium oxide increased from Example 1 having smaller quantity of metallic chromium and hydrated chromium oxide to Example 2 and 3 in this order, which means that adhesion after retort treatment of thermoplastic resin layer was improved in accordance with the increase of the increase rate of the specific area. Example 4 is the one of which degree of treatment in alkali solution and in acid solution and electrolytical chromate treatment was smaller, so that micro pores were formed in small numbers and the increase rate of the specific area was small value before and after electrolytical chromate treatment. Therefore, characteristics of can body was the lower limit of practical level. In Example 5 to 8, the aluminum alloy sheet was treated in varied alkali solution and in varied acid solution, and subsequently varied electrolytical chromate treatment was practiced in each Example. In all Examples, the increase rate of the specific area increased by electrolytical chromate treatment and adhesion after retort treatment of resin layer was improved at the same time.

Comparative example 1 is the one omitting treatment in acid solution. In this case, cotton-like smut having inferior adhesion was retained on the surface after treatment in alkali solution, and surface roughness was great before electrolytical chromate treatment, however, micro pores were not observed. Although a part of smut was rejected by dissolving into chromic acid solution after electrolytical chromate treatment, chromium did not normally electrodeposit on the surface and smut was retained so that metallic chromium and hydrated chromium oxide were not uniformly formed, which caused poor adhesion and surface condition. Therefore, characteristics of this can body was unsatisfactory.

Comparative example 2 is the one omitting treatment in alkali solution. In this case, since grease and oxide film on the aluminum alloy surface were not rejected by alkali solution having great dissolving ability for them, micro pores were hardly caused and the quantity of formed micro pores were not uniformly caused according to location. And since the electrolytical chromate treatment was practiced on such an uneven aluminum alloy sheet surface, the laminated resin layer peeled off after neck-in forming, which showed inferior adhesion of the resin layer after forming.

Comparative example 3 is the one omitting electrolytical chromate treatment after treatment in alkali solution and in acid solution. In this case, although enough adhesion of resin layer after forming was obtained, enough adhesion of resin layer after retort treatment could not be obtained.

Comparative example 4 is the one in which increased metallic chromium of 60 mg/m² and increased hydrated chromium oxide of 30 mg/m² were formed on the aluminum alloy sheet. Since the quantity of deposited metallic chromium was increased, the obtained sheet exhibited dark-gray appearance so that it was hard to be adopted in the use where appearance was valued. Moreover, since the quantity of formed hydrated chromium oxide was increased, the hydrated chromium oxide was unevenly formed according to location and the unevenness of the surface was further increased, so that the adhesion of laminated thermoplastic resin layer after forming was deteriorated and the obtained sheet exhibited a dark-gray appearance, which was not preferable.

As Example 9 to 16 of the present invention and Comparative example 5 to 8, an aluminum alloy sheet (JIS 5052) having 0.26 mm of thickness was treated in alkali solution, rinsed, treated in acid solution and rinsed on the conditioned shown in Table 1, and then electrolytically chromate treated on the conditions shown in Table 2 in order, followed by rinsing and drying. Then, the condition of formed micro pores were observed in the same way as Example 1. After the thus surface-treated aluminum alloy sheet was heated to 235° C., biaxially oriented double layered film of copolyester resin composed of upper layer with 15 µm thickness consisting of 88 mole % of polyethylene terephthalate and 12 mole % of polyethylene isophthalate and lower layer with 10 µm thickness of blended resin consisting of 55 weight % of polybutylene terephthalate and 45 weight % of polyester resin composed of 94 mole % of polyethylene terephthalate and 6 mole % of polyethylene isophthalate on the side to be inside of a can of the aluminum alloy sheet of Example 9 to 15 and Comparative example 5 to 8. In the case of Example 16, triple layered film consisting of upper layer and lower layer composed of copolyester resin consisting of 88 mole % of polyethylene terephthalate and 12 mole % of polyethylene isophthalate and intermediate layer of blended resin consisting of 55 weight % of polycarbonate and 45 weight % of polyester resin composed of 94 mole % of polyethylene terephthalate and 6 mole % of polyethylene isophthalate (the thickness of each layer is 10 µm) was laminated on the side to be inside of a can of the aluminum alloy sheet. As for the side to be outside of a can of the aluminum alloy sheet, the same biaxially oriented resin film was simultaneously laminated on the aluminum alloy sheet of Example 9 to 16 and Comparative example 5 to 8. Just after lamination, the laminate was dipped into water and quenched. After drying, the laminate of each Examples and Comparative examples was formed into can body on the same conditions as Example 1 and evaluated based on the same standard as Example 1. The results of evaluation were shown in Table 4.

The detailed treating conditions and results of Example 9 to 16 and Comparative example 5 to 8 were as shown in Table 1, 2 and 4. In the Example 9 to 11, the aluminum alloy sheet was equally treated in alkali solution (NaOH) and in acid solution ($H_2SO_4$) so as to obtain the same surface condition before electrolytical chromate treatment. After that, the thus treated aluminum alloy sheet was electrolytically chromate treated to varied degree. The quantity of metallic chromium and hydrated chromium oxide increased from Example 9 to Example 10 and 11 and adhesion of laminated resin layer after retort treatment was increased accompanied by the increase of the increase rate of the specific area. However, in the case of Example 11, a lot of metallic chromium and hydrated chromium oxide were formed, which caused large unevenness and inferior uniformity to Example 10, so that adhesion of laminated resin layer after forming was slightly inferior to that of Example 10. In the case of Example 12, since the degree of treatment in alkali solution and in acid solution and electrolytical chromate treatment was small, micro pores were formed in small numbers and the increase rate of the specific area was low before and after the chromate treatment, which caused can property at the lower limit of practical level. In the cases of Example 13 to 16, the aluminum alloy sheet was variedly treated in alkali solution and in acid solution and electrolytically treated in chromate solution to varied degree. The increase rate of the specific area was increased by electrolytical chromate treatment and adhesion of laminated resin layer after forming was improved in all these Examples.

In Comparative example 1, treatment in acid solution was omitted and cotton-like smut having an inferior adhesion of resin layer to it was retained on the aluminum alloy surface after treatment in alkali solution, which caused heavy unevenness on the surface before electrolytical chromate treatment, however, formation of micro pores was not detected. Although smut was partially rejected by dissolving into chromate solution after electrolytical chromate treatment, metallic chromium that did not normally deposit on the surface smut was retained, so that metallic chromium and hydrated chromium oxide were unevenly formed, which caused inferior adhesion and surface condition and properties of can produced from the thus obtained aluminum alloy sheet.

In Comparative example 2, treatment in alkali solution was omitted and since grease and oxide film on the aluminum alloy surface were not rejected by alkali solution having great dissolving ability for them, micro pores were hardly caused and the quantity of formed micro pores were greatly varied according to location. And since the electrolytical chromate treatment was practiced on such an aluminum alloy sheet surface having inferior uniformity, the laminated resin layer peeled off after neck-in forming, which showed inferior adhesion of resin layer after forming.

In Comparative example 3, electrolytical chromate treatment was omitted after treatment in alkali solution and in acid solution. In this case, although enough adhesion of resin layer after forming was obtained, adhesion of resin layer after retort treatment was not enough.

In Comparative example 4, quantity of formed metallic chromium and that of hydrated chromium oxide were increased. Since the quantity of deposited metallic chromium was increased, the obtained sheet exhibited dark-gray appearance so that it was hard to be adopted in the use where appearance was valued. Moreover, since the quantity of formed hydrated chromium oxide was increased, the hydrated chromium oxide was unevenly formed according to location and the unevenness of the surface was too much increased, so that the adhesion of laminated thermoplastic resin layer after forming was deteriorated as well as the obtained sheet exhibited dark-gray appearance, which was not preferable. Table 1 to 4 (shown later)

INDUSTRIAL POSSIBILITY

The manufacturing method of a thermoplastic resin laminated aluminum alloy sheet is the one excellent in the viewpoint of prevention of environmental pollution, high-speed productivity and cost reduction. And the obtained thermoplastic resin laminated aluminum alloy sheet has excellent adhesion after forming such that the laminated resin layer does not peel off when the laminate is heavily formed and further retorted after forming and excellent corrosion resitance. Therefore, it has great industrial value.

SUMMARY

The objective of the present invention is to produce a thermoplastic resin laminated aluminum alloy sheet having excellent adhesion after forming, such that the laminated thermoplastic resin does not peel off even when the laminate is deep-drawn, stretch-formed and further pressed to shape and excellent adhesion after sterilization, production method thereof and production equipment thereof.

To achieve the objective of the present invention, an aluminum alloy sheet is treated in alkali solution and in acid solution in order so as to make the surface of the aluminum alloy sheet into a specified surface condition and then electrolytically chromate treated using known method so as to form a double layered film composed of a lower layer of metallic chromium and an upper layer of hydrated chromium oxide and to make the surface of the aluminum alloy sheet into a specified surface condition, and after that a thermoplastic resin is laminated on it. As the result, a thermoplastic resin laminated aluminum alloy sheet having excellent adhesion after forming which endures heavy forming can be produced.

TABLE 1

Surface treatment conditions of example 1–16 and comparative Example 1–8

|  | Treating conditions using alkali aqueous solution | | | | Treating conditions using acid aqueous solution | | | |
| --- | --- | --- | --- | --- | --- | --- | --- | --- |
|  | | Concentration (g/l) | Temp. (° C.) | Time (sec.) | | Concentration (g/l) | Temp. (° C.) | Time (sec.) |
| Example 1, 9 | NaOH | 70 | 60 | 10 | $H_2SO_4$ | 70 | 25 | 10 |
| Example 2, 10 | NaOH | 70 | 60 | 10 | $H_2SO_4$ | 70 | 25 | 10 |
| Example 3, 11 | NaOH | 70 | 60 | 10 | $H_2SO_4$ | 70 | 25 | 10 |
| Example 4, 12 | NaOH | 150 | 45 | 5 | $HNO_3$ | 50 | 30 | 3 |
| Example 5, 13 | $Na_2SiO_3$ | 60 | 45 | 20 | HCl | 50 | 45 | 20 |
| Example 6, 14 | NaOH | 50 | 60 | 15 | $H_2SO_4$ | 15 | 15 | 15 |
| Example 7, 15 | NaOH | 50 | 60 | 15 | $H_2SO_4$ | 70 | 15 | 15 |
| Example 8, 16 | $Na_2CO_3$ | 100 | 80 | 3 | HCl | 20 | 25 | 10 |
| Comparative Ex. 1, 5 | NaOH | 50 | 50 | 20 | Treatment omitted | | | |
| Comparative Ex. 2, 6 | Treatment omitted | | | | $H_2SO_4$ | 15 | 15 | 30 |
| Comparative Ex. 3, 7 | NaOH | 70 | 60 | 10 | $H_2SO_4$ | 70 | 25 | 10 |
| Comparative Ex. 4, 8 | NaOH | 100 | 60 | 10 | $H_2SO_4$ | 100 | 35 | 10 |

TABLE 2

Electrolytical chromate treatment conditions of Example 1–16 and comparative Example 1–8

|  | Concentration of $CrO_3$ (g/l) | Concentration of additive (g/l) | | Temp. (° C.) | Current density (A/dm$^2$) | Amounts of chromium in metallic chromium layer (mg/m$^2$) | Amounts of chromium hydrated chromium oxide layer (mg/m$^2$) |
| --- | --- | --- | --- | --- | --- | --- | --- |
| Example 1, 9 | 20 | NaF | 1.0 | 45 | 10 | 3 | 3 |
| Example 2, 10 | 60 | $HBF_4$ | 1.0 | 55 | 70 | 15 | 10 |
| Example 3, 11 | 100 | $NH_4F$ | 8.0 | 58 | 30 | 45 | 20 |
| Example 4, 12 | 100 | NaF | 0.5 | 30 | 10 | 2 | 1 |
| Example 5, 13 | 100 | KF $H_2SO_4$ | 4.0 1.5 | 55 | 50 | 50 | 25 |
| Example 6, 14 | 20 | NaF | 5.0 | 40 | 20 | 10 | 12 |
| Exmaple 7, 15 | 20 | HF | 1.0 | 40 | 10 | 5 | 18 |
| Example 8, 16 | 100 | $H_2SO_4$ | 4.0 | 40 | 100 | 15 | 15 |
| Comparative EX. 1, 5 | 30 | NaF | 1.5 | 40 | 30 | 10 | 10 |
| Comparative Ex. 2, 6 | 30 | NaF | 1.5 | 30 | 20 | 2 | 1 |
| Comparative Ex. 3, 7 | Electrolytical chromate treatment omitted | | | | | | |
| Comparative Ex. 4, 8 | 80 | NaF | 4.0 | 45 | 70 | 60 | 30 |

TABLE 3

Surface condition and characteristics of Example 1–8 and comparative Example 1–4

| | Condition of formed micro pores | | | Increase rate of Specific area (%) | | Characteristics of can body | | | |
|---|---|---|---|---|---|---|---|---|---|
| | Maximum Diameter (Minimum diameter) (nm) | Maximum depth (Average diameter) (nm) | Occupied area rate of pores (%) | before electrolytical chromate treatment | after electrolytical chromate treatment | A | B | C | D |
| Example 1 | 1200 (75) | 500 (575) | 80 | 18 | 23 | ⊙ | ⊙ | ⊙ | ○ |
| Example 2 | 1200 (75) | 500 (575) | 80 | 18 | 32 | ⊙ | ⊙ | ⊙ | ⊙ |
| Example 3 | 1200 (75) | 500 (575) | 80 | 18 | 39 | ⊙ | ⊙ | ⊙ | ⊙ |
| Example 4 | 500 (50) | 200 (280) | 10 | 3 | 7 | ○ | ○ | ○ | ○ |
| Example 5 | 3000 (150) | 950 (900) | 90 | 29 | 45 | ○ | ○ | ○ | ⊙ |
| Example 6 | 900 (75) | 350 (430) | 42 | 12.5 | 31 | ⊙ | ⊙ | ⊙ | ⊙ |
| Example 7 | 1300 (100) | 600 (600) | 80 | 19.5 | 37 | ⊙ | ⊙ | ⊙ | ⊙ |
| Example 8 | 1500 (100) | 700 (625) | 30 | 9.8 | 30 | ○ | ⊙ | ○ | ⊙ |
| Comparative EX. 1 | — (—) | 1200 (—) | — | 32 | 48 | × | × | × | × |
| Comparative Ex. 2 | 450 (50) | 150 (300) | 7.5 | 2.8 | 5 | ○ | ○ | △ | ○ |
| Comparative Ex. 3 | 1200 (75) | 500 (575) | 80 | 18 | 18 | ⊙ | ⊙ | ⊙ | △ |
| Comparative Ex. 4 | 1700 (125) | 800 (690) | 88 | 28 | 48 | ○ | ⊙ | △ | ○ |

TABLE 4

Surface condition and characteristics of Example 9–16 and comparative Example 5–8

| | Condition of formed micro pores | | | Increase rate of Specific area (%) | | Characteristics of can body | | | |
|---|---|---|---|---|---|---|---|---|---|
| | Maximum diameter (Minimum diameter) (nm) | Maximum depth (Average diameter) (nm) | Occupied area rate of pores (%) | before electrolytical chromate treatment | after electrolytical chromate treatment | A | B | C | D |
| Example 9 | 1200 (100) | 600 (600) | 85 | 20 | 25 | ⊙ | ⊙ | ⊙ | ○ |
| Example 10 | 1250 (100) | 600 (600) | 85 | 20 | 34 | ⊙ | ⊙ | ⊙ | ⊙ |
| Example 11 | 1200 (100) | 600 (600) | 85 | 20 | 41 | ⊙ | ⊙ | ○ | ⊙ |
| Example 12 | 550 (75) | 250 (290) | 12 | 5 | 8 | ○ | ○ | ○ | ○ |
| Example 13 | 3000 (150) | 1000 (900) | 95 | 30 | 45 | ○ | ○ | ○ | ⊙ |
| Example 14 | 1500 (100) | 600 (625) | 45 | 13.5 | 32 | ⊙ | ⊙ | ⊙ | ⊙ |
| Example 15 | 1650 (125) | 610 (660) | 82 | 22 | 39 | ⊙ | ⊙ | ⊙ | ⊙ |
| Example 16 | 1750 (125) | 750 (690) | 33 | 9.9 | 31 | ○ | ⊙ | ○ | ⊙ |
| Comparative EX. 5 | — (—) | 1300 (—) | — | 36.5 | 49 | × | × | × | × |
| Comparative Ex. 6 | 450 (50) | 150 (300) | 7.5 | 2.8 | 6 | ○ | ○ | △ | ○ |
| Comparative Ex. 7 | 1250 (100) | 600 (600) | 85 | 20 | 20 | ⊙ | ⊙ | ⊙ | △ |
| Comparative Ex. 8 | 1900 (125) | 900 (720) | 90 | 29 | 49 | ○ | ○ | △ | ○ |

What is claimed is:

1. A thermoplastic resin laminated aluminum alloy sheet wherein an aluminum alloy sheet is treated in alkali solution and then in acid solution so as to make the surface of said aluminum alloy sheet into a condition in which the increase rate of the specific area is in the range of 3 to 30%, and after that electrolytically chromate treated followed by being laminated by a thermoplastic resin on at least one side of said aluminum alloy sheet wherein said resin is securely adhered to said sheet.

2. The thermoplastic resin laminated aluminum alloy sheet according to claim 1 wherein micro pores are formed on the surface of said aluminum alloy sheet after said treatment in acid solution so that the diameter of said micro pores is in the range of 50 to 3000 nm, the maximum depth of said micro pores is 1000 nm or less and the occupied area rate by said micro pores is in the range of 10 to 95%.

3. The thermoplastic resin laminated aluminum alloy sheet according to claim 2 wherein said micro pores are formed in the state that average diameter is in the range of 200 to 900 nm, depth is shallower than half said diameter and said micro pores are hollowed out along thickness direction from the surface of said aluminum alloy sheet.

4. A manufacturing method of the thermoplastic resin laminated aluminum alloy sheet according to any of claim 3 characterize in that said alkali solution contains 10 to 200 g/l of one or more than one kind selected from the group consisting of hydroxide, carbonate, bicarbonate, phosphate, silicate and borate of alkali metal or ammonium as main component and said acid solution contains 10 to 300 g/l of one or more than one kind selected from the group consisting of sulfuric acid, hydrochloric acid, nitric acid and phosphoric acid as main component.

5. A manufacturing method of the thermoplastic resin laminated aluminum alloy sheet according to claim 3 characterize in that said treatment in alkali solution is dipping said aluminum alloy sheet into alkali solution or spraying alkali solution onto said aluminum alloy sheet and said treatment in acid solution is dipping said aluminum alloy sheet into acid solution or spraying acid solution onto said aluminum alloy sheet.

6. A manufacturing method of the thermoplastic resin laminated aluminum alloy sheet according to claim 3 characterize in that said aluminum alloy sheet is electrolytically chromate treated using a solution comprising chromic acid anhydride as a main component added by small quantity of one or more than one kind selected from the group consisting of sulfuric acid, hydrofluoric acid, hydrofluoboric acid, hydrofluosilicic acid, and fluoride, fluoboride, fluosilicate, of alkali metal or ammonium.

7. A manufacturing method of the thermoplastic resin laminated aluminum alloy sheet according to claim 3 characterize in that said thermoplastic resin is one or more than one kind selected from the group consisting of polyethylene terephthalate, copolyester mainly composed of ethylene terephthalate unit, polyester mainly composed of butylene terephthalate unit, blended resin of these resins or multi-layered composite resin of these resins.

8. A manufacturing method of the thermoplastic resin laminated aluminum alloy sheet according to claim 3 characterize in that said laminated resin is a multi-layered resin comprising an upper layer and a lower layer of polyester resin and an intermediate layer of a composite resin composed of polyester resin blended with bisphenol A polycarbonate or bisphenol A polycarbonate.

9. A manufacturing equipment for the thermoplastic resin laminated aluminum alloy sheet according to claim 3 characterize in that treating tank for alkali treatment, rinsing tank, treating tank for acid treatment, rinsing tank, treating tank for electrolytical chromate treatment, rinsing tank, drying equipment and equipment for lamination of thermoplastic resin are serially arranged in order.

10. A manufacturing method of the thermoplastic resin laminated aluminum alloy sheet according to claim 1, characterized in that said alkali solution contains 10 to 200 g/l of one or more than one kind selected from the group consisting of hydroxide, carbonate, bicarbonate, phosphate, silicate and borate of alkali metal or ammonium as main component and said acid solution contains 10 to 300 g/l of one or more than one kind selected from the group consisting of sulfuric acid, hydrochloric acid, nitric acid and phosphoric acid as main component.

11. A manufacturing method of the thermoplastic resin laminated aluminum alloy sheet according to claim 1, characterized in that said treatment in alkali solution is dipping said aluminum alloy sheet into alkali solution or spraying alkali solution onto said aluminum alloy sheet; and said treatment in acid solution is dipping said aluminum alloy sheet into acid solution or spraying acid solution onto said aluminum alloy sheet.

12. A manufacturing method of the thermoplastic resin laminated aluminum alloy sheet according to claim 1, characterized in that said aluminum alloy sheet is electrolytically chromate treated using a solution comprising chromic acid anhydride as a main component added by small quantity of one or more than one kind selected from the group consisting of sulfuric acid, hydrofluoric acid, hydrofluoboric acid, hydrofluosilicic acid, and fluoride, fluoboride, fluosilicate, of alkali metal or ammonium.

13. A manufacturing method of the thermoplastic resin laminated aluminum alloy sheet according to claim 1, characterized in that said thermoplastic resin is one or more that one kind selected from the group consisting of polyethylene terephthalate, copolyester mainly composed of ethylene terephthalate unit, polyester mainly composed of butylene terephthalate unit, blended resin of these resins or multi-layered composite resin of these resins.

14. A manufacturing method of the thermoplastic resin laminated aluminum alloy sheet according to claim 1, characterized in that said laminated resin is a multi-layered resin comprising an upper layer and a lower layer of polyester resin and an intermediate layer of a composite resin composed of polyester resin blended with bisphenol A polycarbonate or bisphenol A polycarbonate.

15. A manufacturing equipment for the thermoplastic resin laminated aluminum alloy sheet according to claim 1, characterized in that treating tank for alkali treatment, rinsing tank, treating tank for acid treatment, rinsing tank, treating tank for electrolytical chromate treatment, rinsing tank, drying equipment and equipment for lamination of thermoplastic resin are serially arranged in order.

16. A manufacturing method of the thermoplastic resin laminated aluminum alloy sheet according to claim 2 characterized in that said alkali solution contains 10 to 200 g/l of one or more than one kind selected from the group consisting of hydroxide, carbonate, bicarbonate, phosphate, silicate and borate of alkali metal or ammonium as main component and said acid solution contains 10 to 300 g/l of one or more than one kind selected from the group consisting of sulfuric acid, hydrochloric acid, nitric acid and phosphoric acid as main component.

17. A manufacturing method of the thermoplastic resin laminated aluminum alloy sheet according to claim 2, characterized in that said treatment in alkali solution is dipping said aluminum alloy sheet into alkali solution or spraying alkali solution onto said aluminum alloy sheet and said treatment in acid solution is dipping said aluminum alloy sheet into acid solution or spraying acid solution onto said aluminum alloy sheet.

18. The thermoplastic resin laminated aluminum alloy sheet of claim 1 having a deeply formed shape.

19. The thermoplastic resin laminated aluminum alloy sheet of claim 18 wherein said deeply formed shape is the shape of a can adapted for a packing can.

20. The thermoplastic resin laminated aluminum alloy sheet of claim 1 having a deeply formed shape.

21. The thermoplastic resin laminated aluminum alloy sheet of claim 20 wherein said deeply formed shape is the shape of a can adapted for a packing can.

22. A manufacturing method of the thermoplastic resin laminated aluminum alloy sheet according to claim 2, wherein said aluminum alloy sheet is electrolytically chromate treated using a solution comprising chromic acid anhydride as a main component to which is added a small quantity of at least one of sulfuric acid, hydrofluoric acid, hydrofluoboric acid, hydrofluosilicic acid and fluoride, fluoboride, fluosilicate, or of alkali metal or ammonium.

23. A manufacturing method of the thermoplastic resin laminated aluminum alloy sheet according to claim 2, wherein said thermoplastic resin is one or more polyester resin selected from the group consisting of polyethylene terephthalate, copolyester mainly composed of ethylene terephthalate units, polyester mainly composed of butylene terephthalate units, blends of said polyester resins or multilayered composites of these resins.

24. A manufacturing method of the thermoplastic resin laminated aluminum alloy sheet according to claim 2, wherein said laminated resin is a multilayered resin comprising an upper layer and a lower layer of polyester resin and an intermediate layer of a composite resin composed of polyester resin blended with bisphenol A polycarbonate or bisphenol A polycarbonate.

* * * * *